(12) United States Patent
Harned et al.

(10) Patent No.: US 7,826,142 B2
(45) Date of Patent: Nov. 2, 2010

(54) METHOD FOR IMPROVED OPTICAL DESIGN USING DETERMINISTICALLY DEFINED SURFACES

(75) Inventors: Nora-Jean Harned, Redding, CT (US);
Richard A. Gontin, Rye, NY (US);
Robert D. Harned, Redding, CT (US);
Azat M. Latypov, Danbury, CT (US);
Stanislav Y. Smirnov, Bethel, CT (US)

(73) Assignee: ASML Holding N.V., Veldhoven (NL)

( * ) Notice: Subject to any disclaimer, the term of this patent is extended or adjusted under 35 U.S.C. 154(b) by 1192 days.

(21) Appl. No.: 11/117,490

(22) Filed: Apr. 29, 2005

(65) Prior Publication Data

US 2006/0245094 A1 Nov. 2, 2006

(51) Int. Cl.
*G02B 3/00* (2006.01)
(52) U.S. Cl. ........................... 359/642; 264/1.1
(58) Field of Classification Search ................ 359/642; 351/159, 177; 264/1.1; 65/37
See application file for complete search history.

(56) References Cited

U.S. PATENT DOCUMENTS

| | | | |
|---|---|---|---|
| 2002/0071092 A1* | 6/2002 | Suzaki et al. | 351/159 |
| 2003/0086157 A1* | 5/2003 | McGuire, Jr. | 359/352 |
| 2003/0086171 A1* | 5/2003 | McGuire | 359/497 |
| 2003/0174300 A1* | 9/2003 | Endo et al. | 355/55 |

FOREIGN PATENT DOCUMENTS

| | | |
|---|---|---|
| JP | 7-036959 A | 2/1995 |
| JP | 9-281416 A | 10/1997 |
| JP | 11-242690 A | 9/1999 |
| WO | WO 03/060892 A2 | 7/2003 |

OTHER PUBLICATIONS

F. Twyman, Prism and Lens Making: A textbook for optical glassworkers, 1952, Hilger and Watts LTD, 2nd edition, pp. 322-334.*
Robert Kestner et al., "System Wavefront Correction Using A Complex Aspheric Mirror," Proceedings of SPIE 5533, 108 (2004).
Decision of Rejection mailed Oct. 5, 2009 for Japanese Application No. 2006-126210, 3 pgs.

* cited by examiner

*Primary Examiner*—Joseph Martinez
*Assistant Examiner*—James R Greece
(74) *Attorney, Agent, or Firm*—Sterne, Kessler, Goldstein & Fox P.L.L.C

(57) ABSTRACT

An embodiment of the present invention provides a method for designing optical surfaces. According to this method, m optical surfaces are defined, such that each successive optical surface receives a wavefront from a previous optical surface. Wavefront aberrations caused by each optical surface are calculated. The changes at each respective optical surface required to compensate for the wavefront aberration caused by the respective optical surfaces are then calculated. A desired optical profile for each of the m optical surfaces is determined in accordance with the calculated changes to each respective optical surface.

7 Claims, 7 Drawing Sheets

METHOD FOR IMPROVED OPTICAL DESIGN USING DETERMINISTICALLY DEFINED SURFACES

BACKGROUND OF THE INVENTION

1. Field of the Invention

The present invention is directed to the design of optical systems.

2. Background Art

The types of optical surfaces available during the optical design process limit the performance of an optical system. Typically, spherical and specific kinds of aspheric surfaces are used when designing an optical system. Incorporating aspheric surfaces in a design is important because they add extra degrees of freedom during the design process that enable more aberrations to be corrected with fewer elements, as compared to an optical system with just spherical surfaces. However, the level to which aberrations can be corrected depends on the specific types of aspheric surfaces available in the optical design process. For example, the critical dimension, overlay and usable depth of focus capabilities of lithography tools are influenced by the aspheric surfaces and by design optimization routines available to optical designers and engineers.

Optimization algorithms provided in commercially available optical design tools are also limited by the optical surfaces available during design. One limiting factor is the cost to implement the optimization algorithms. The optimization algorithms currently available in optical design programs use multiple (spherical and aspherical) optical elements to correct aberrations, as mentioned above. According to these conventional algorithms, the number of optical elements needed to produce an acceptable image quality is often cost-prohibitive.

Therefore, what is needed is an improved optical design algorithm.

BRIEF SUMMARY OF THE INVENTION

According to an embodiment of the present invention there is provided a method for designing an optical system. The method includes the following steps; defining m optical surfaces, such that each successive optical surface receives a wavefront from a previous optical surface; calculating wavefront aberrations caused by each optical surface; calculating changes at each respective optical surface required to compensate for the wavefront aberration caused by the respective optical surfaces; and determining a desired optical profile for each of the m optical surfaces.

According to one embodiment of the present invention, calculating changes at each respective optical surface includes two sub-steps. First, a representative collection of object points and/or image points optically conjugate to the m optical surfaces is defined. Second, the representative collection of points are averaged over to determine the changes at each respective optical surface that produce a wavefront profile of a predetermined shape at an image field.

According to an alternative embodiment of the present invention, calculating changes at each respective optical surface includes two alternative sub-steps. First, a quantitative measure of the wavefront aberration is defined. Second, a particular optical surface profile is determined that minimizes the quantitative measure subject to a predetermined set of constraints.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

DETAILED DESCRIPTION OF THE INVENTION

Figure 1:
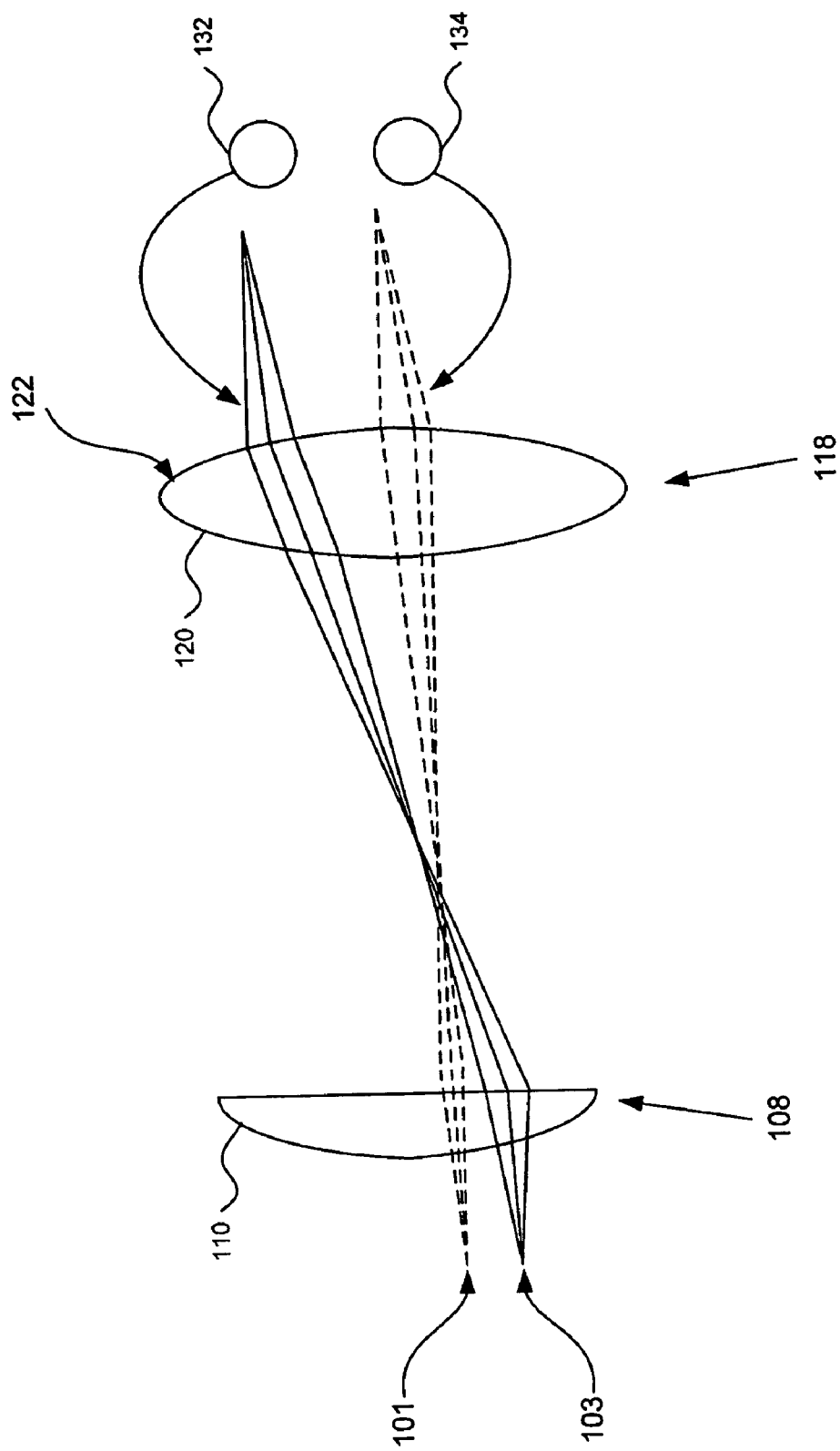
FIG. 1 is a ray diagram of a transmissive optical system.

The present invention will now be described with reference to the accompanying drawings. In the drawings, like reference numbers may indicate identical or functionally similar elements.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is to be appreciated that a method in accordance with an embodiment of the present invention can be used to design various types of optical systems that are processed using computer controlled polishing technology (described below). Example optical systems can include, but are not limited to, lithography systems, maskless lithography systems, projection systems, telescope systems, microscope systems, or any other optical system used to pattern and/or focus light.

Aberrations by Spherical Surfaces

A light beam's optical wavefront is typically aberrated after passing through an optical surface. One way aberrations can be understood is in terms of light rays. Consider a point source of light, a spherical optical surface, and an image plane. Light rays emanate from the point source in all directions. Lights rays that are incident on different points of the spherical optical surface are, in general, deviated from an ideal path that would otherwise lead to the formation of a perfect image. Consequently, the light rays emerging from the spherical optical surface do not all meet at a single point on the image plane. Since the rays do not all meet at a single point, the image formed by the light rays emerging from the optical surface appear blurred. The optical path difference (OPD) is often used to quantify the amount that light rays are aberrated by an optical surface.

Another way aberrations can be understood is in terms of wavefronts. Again, imagine a point source, a spherical optical surface, and an image plane. Spherical wavefronts emanate from the point source in all directions. Spherical wavefronts incident on the spherical optical surface are deformed, resulting in a blurry (aberrated) image at the image plane. When discussed herein, wavefronts and light rays will be used to describe and interpret aberrations.

Figure 3:
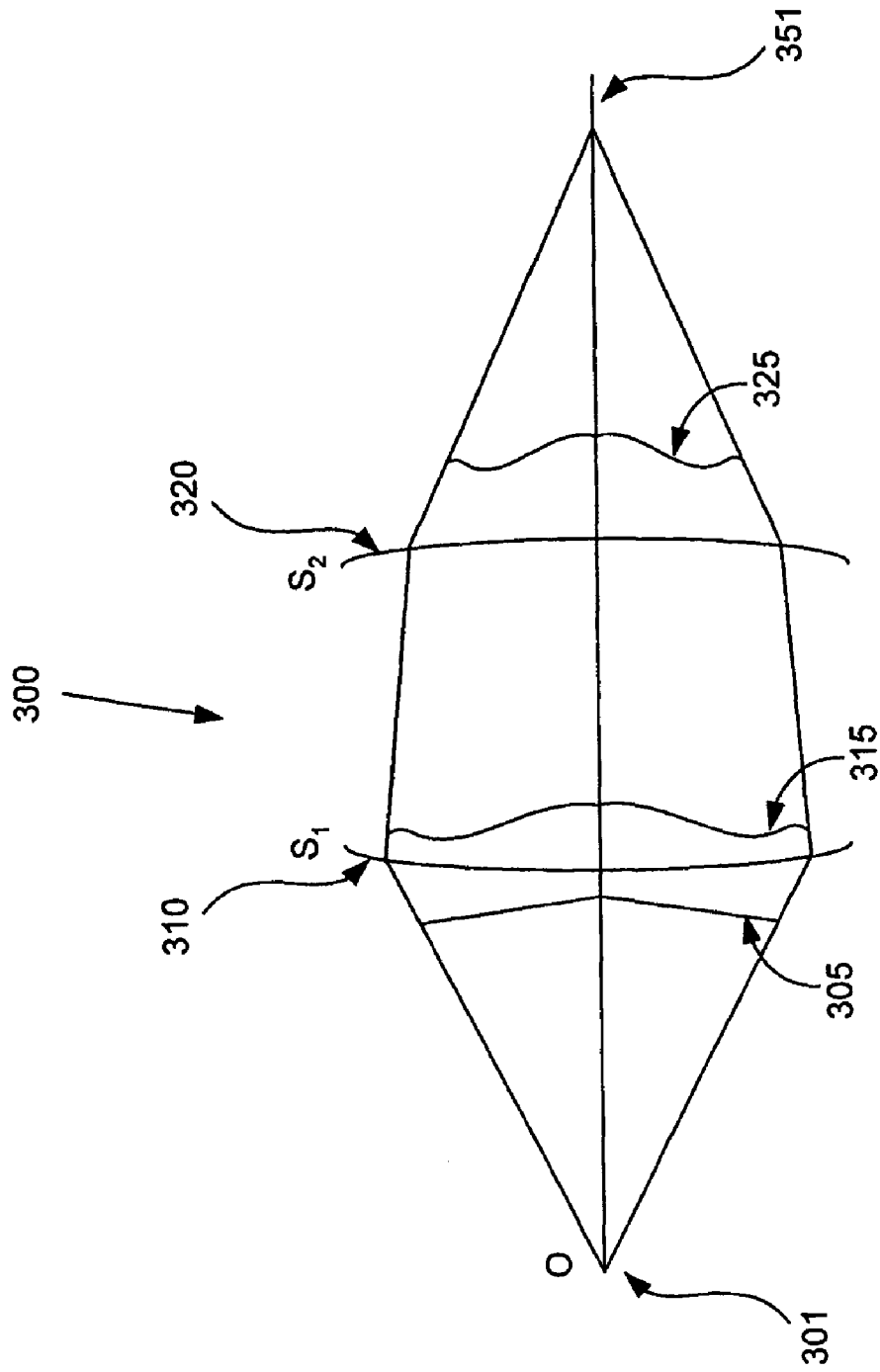
FIG. 3 is a ray diagram depicting a spherical wavefront being deformed after emerging from an optical surface.

As an example, FIG. 3 is a ray diagram depicting a spherical wavefront being aberrated by traversing a spherical optical surface. The diagram includes an object 301, a thick lens 300 having a first spherical surface 310 and a second spherical surface 320, and an image point 351.

A spherical wavefront 305 emanates from object 301 and is incident on spherical surface 310. A first aberrated wavefront 315 emerges from spherical surface 310 having an aberrated (non-spherical) shape. First aberrated wavefront 315 is then incident on spherical surface 320 and aberrated further, resulting in a second aberrated wavefront 325. Second aberrated wavefront 325 emerging from spherical surface 320 results in an imperfect (blurred) image point 351.

A method in accordance with an embodiment of the present invention proposes incorporating optical surfaces in an optical system specifically designed to redirect rays to a specific location or modify the shape of a wavefront so that the optical surfaces do not substantially aberrate the emerging rays or wavefronts. The discussion will now address a method for determining and designing optical surfaces that do not substantially aberrate light rays or wavefronts.

Deterministically Designing Optical Surfaces

With computer controlled polishing technology, the types of optical surfaces available during optical design are not limited to spherical and specific types of aspheric surfaces. In fact, it is possible to design optical surfaces with any type of profile for which an equation can be written or a grid of data points can be generated. With this technology, determining an equation for an optical surface that optimizes optical performance is of utmost importance in optical design programs. The below-described method is a technique for determining an equation for such an optical surface. This equation can then used as input for polishing optical surfaces using computer controlled polishing technology.

Figure 2:
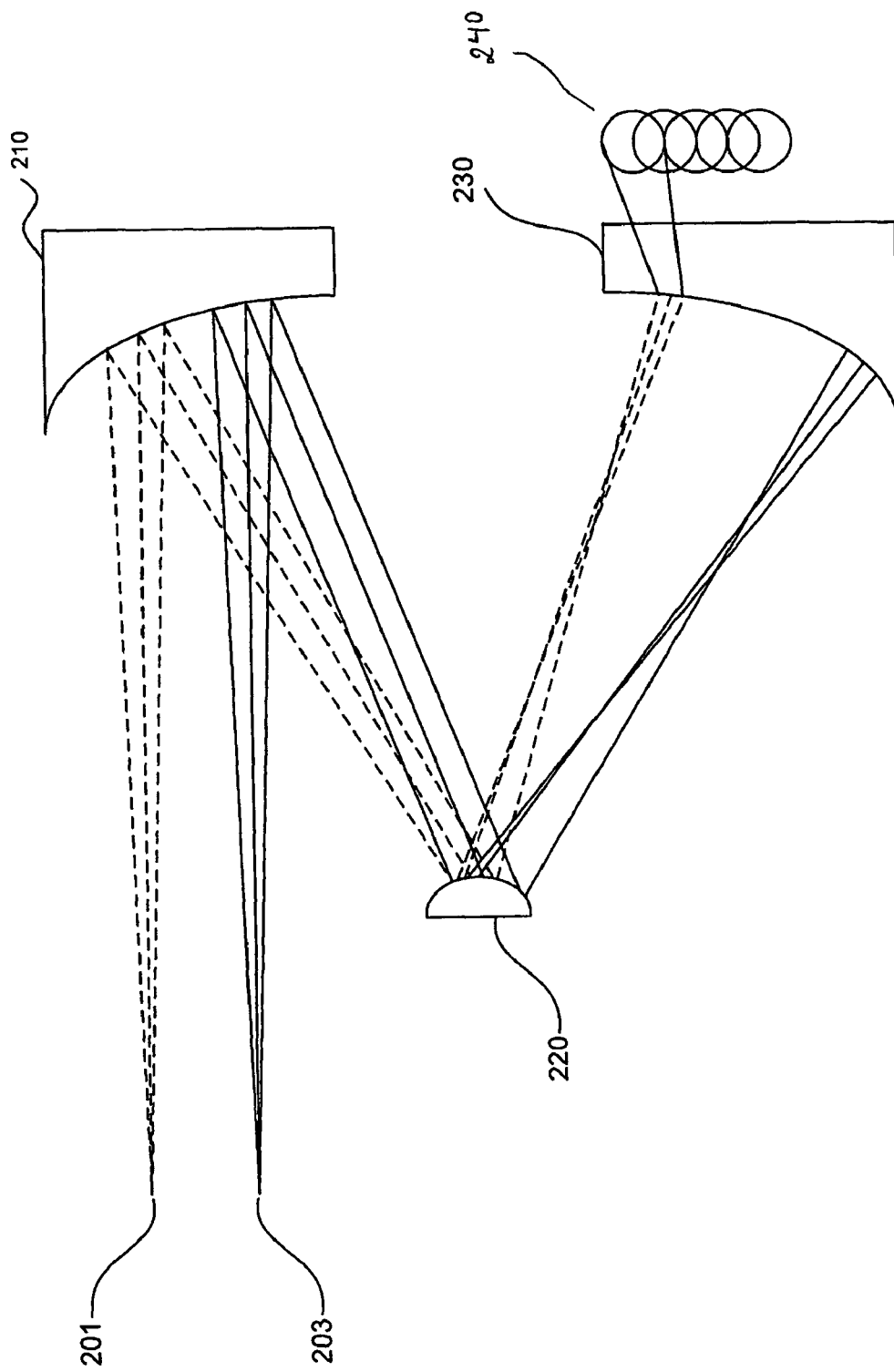
FIG. 2 is a ray diagram of a reflective optical system.

An embodiment of the present invention involves determining an optical surface profile that renders a desired image at an image plane. An overview of this determination scheme is presented with reference to an exemplary transmissive optical system (FIG. 1) and an exemplary reflective optical system (FIG. 2). However, it is to be appreciated that FIGS. 1 and 2 are presented for illustrative purposes only, and not as a limitation. For example, the method to be described in detail below can be used to find corrected optical surface profiles for optical systems having any combination of optical surfaces (e.g., transmissive and reflective or combinations thereof).

FIG. 1 is a ray diagram of a transmissive optical system, including a lens 108 and a lens 118. A first position 101 on the object plane is chosen. Light rays from first position 101 pass through lens 108 and lens 118. Lens 108 has a spherical surface 110 that can cause spherical aberrations and lens 118 has two spherical surfaces 120 and 122 that can cause spherical aberrations. An optical surface profile can be determined for optical surfaces 110, 120, and 122 that renders a desired image of first position 101.

It is to be appreciated that the plane surface of lens 108 can also cause abberations. Optionally, the plane surface of lens 108 can also be aspherized by a polishing process to improve its optical performance.

Iterating the process, a second position 103 on the object plane is chosen. Light rays from second position 103 also pass through lens 108 and 118. An optical surface profile can be determined that renders a desired image of second position 103. The process can be repeated for multiple positions on the object plane.

Images corresponding to first position 101 and second position 103 will cover a finite area, as indicated by first circle 132 and second circle 134. As more and more positions are chosen in the object plane, the corresponding images will begin to overlap. In other words, there will be overlap in the images in the image plane that correspond to the multiple positions chosen in the object plane. Hence, a best-fit optical surface profile is determined that results in the image overlaps having certain predetermined characteristics. The determination of the best-fit optical surface profile is described below.

FIG. 2 is a ray diagram of a reflective optical system, including a first mirror 210 and a second mirror 220. A first position 201 and a second position 203 are chosen. Light rays from first position 201 and second position 203 are reflected from mirror 210 and incident on mirror 220. The light rays are subsequently reflected by mirror 220 and incident on element 230. Similar to the example in FIG. 1, if multiple positions in the object plane are chosen, the corresponding images can overlap, as indicated schematically be overlapping circles 240. Hence, a best-fit optical surface profile is determined.

Figure 4:
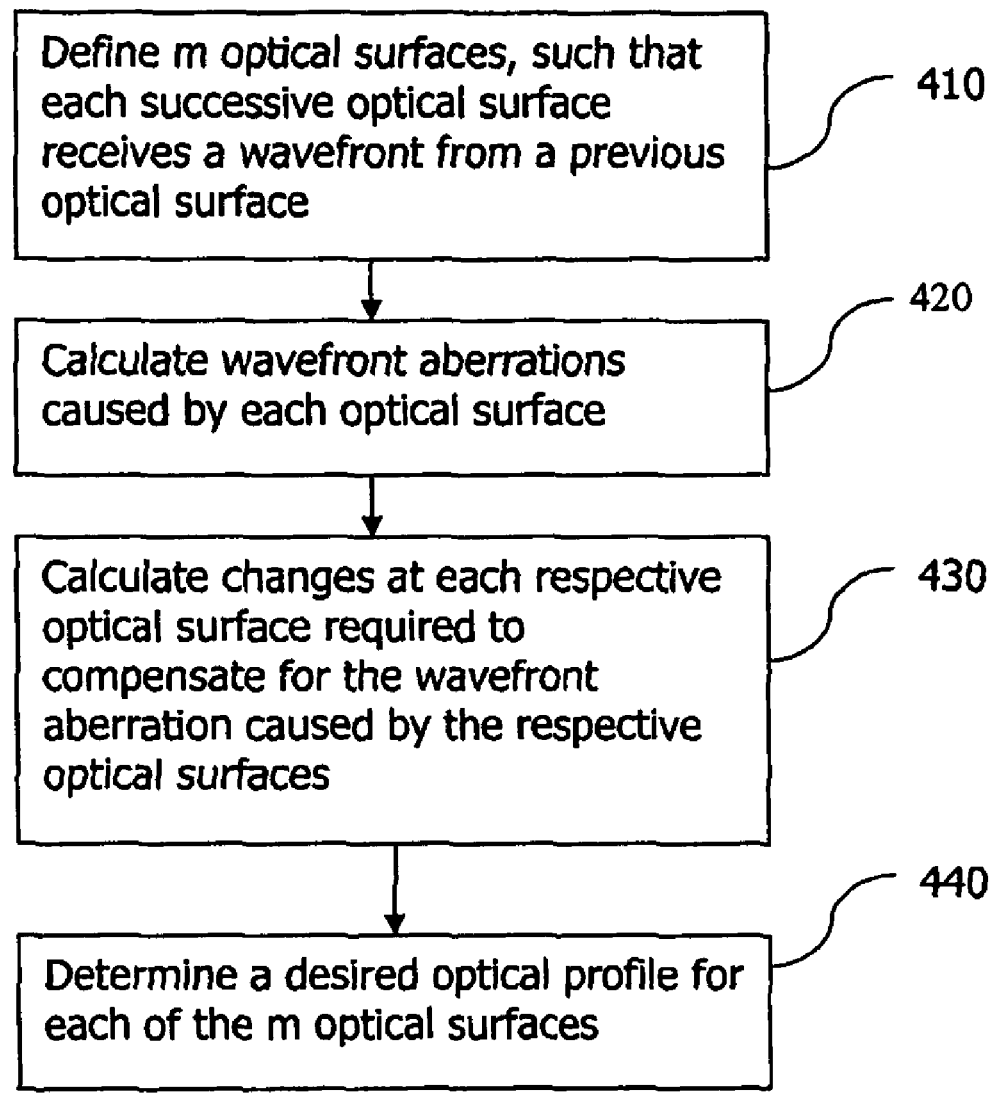
FIG. 4 is a flowchart depicting an exemplary method for designing an optical system, according to one embodiment of the present invention.

FIG. 4 is a flowchart depicting a method for determining and designing optical surfaces, according to an embodiment of the present invention. This method can be used to design optical surfaces that do not cause substantial wavefront aberrations. The method begins in step 410 in which m optical surfaces are defined, such that each successive optical surface receives a wavefront from a previous optical surface. Thus, a system with ten lenses has m=20 optical surfaces, two optical surfaces for each lens. For example, the system in FIG. 3 has one thick lens 300 and m=2 optical surfaces (optical surfaces 310 and 320).

In step 420, wavefront aberrations caused by each optical surface are calculated. This can be done, for example, by defining a mathematical function $OPD_1(x_0, y_0, x, y)$ that describes the deviation between perfect (spherical) and aberrated wavefronts for rays emerging from surface 310 at points with coordinates x and y.

In step 430, changes at each respective optical surface required to compensate for the wavefront aberrations caused by the respective optical surfaces are calculated. For example, the following equation describes how the shape of surface 310 can be modified to ensure that wavefront 315 emerging from surface 310 is spherical (un-aberrated):

$$\Delta_1(x_0, y_0, x, y) = -\frac{OPD_1(x_0, y_0, x, y)}{n-1}; \quad \text{Equation (1)}$$

where $\Delta(x_0, y_0, x, y)$ is the deviation in thickness of optical material from a spherical profile as a function of coordinates (x, y) on the optical surface (in this case, surface 310) of the optical element, and n is the refractive index of the optical material between surfaces 310 and 320. This function can also be thought of as the required deviation in surface profile that must be achieved through optical polishing at coordinates (x, y) on surface 310 in order to compensate for an aberration of a spherical wave emitted from the point 301 with coordinates ($x_0$, $y_0$) in the object plane.

A correction equation similar to Equation (1) can be applied to each optical surface in the optical system. For example, although surface 310 is (mathematically) corrected to transmit an un-aberrated wavefront, another wavefront error is likely to result upon transmission through surface 320. The above-defined first and second mathematical functions can be applied to surface 320, and is given by the following equation:

$$\Delta_2(x_0, y_0, x, y) = -\frac{OPD_2(x_0, y_0, x, y)}{n-1}, \quad \text{Equation (2)}$$

where $OPD_2(x_0, y_0, x, y)$ is the optical path difference error induced in wavefront 315 by being transmitted through surface 320, and $\Delta_2(x_0, y_0, x, y)$ is the deviation in thickness at each point x and y of surface 320 from a spherical surface.

The above-described method can be applied in an iterative fashion, one surface at a time to correct optical systems of any number of surfaces. Equation (1) represents a surface correction profile for a first optical surface. Equation (2) represents a surface correction profile for a second optical surface. Subsequent equations, similar to equations (1) and (2), can be found for all the optical surfaces in an optical system, as would be appreciated by one of ordinary skill in the art.

In step 440, a desired optical profile for each of the m optical surfaces is determined. For example, the desired optical profile can be a solution to Equation (1) or Equation (2) or an analogous equation. The solution can be used by a computer controlled polishing tool to polish m optical surfaces.

In effect, when surface 310 is polished according to the prescription implied by its surface correction function $\Delta(x_0, y_0, x, y)$, and summarized in step 430 (FIG. 4), the original wavefront error that would result before corrective polishing is precisely cancelled. However, the precise (mathematical) cancellation implied by surface correction function $\Delta(x_0, y_0, x, y)$ cannot typically be realized in actual optical systems. As described above, different amounts of overlap of the wavefront aberrations at each image field point make correcting all aberrations difficult. In other words, a surface profile can be polished into an optical surface that corrects the aberrations at an image field of a particular point ($x_0$, $y_0$) of the object, but this optical surface profile may not correct aberrations for every point of the object. Therefore, a process is used to achieve substantial canceling of the wavefront aberration so as to produce an image of the entire object that is of a quality that is acceptable for a given application, i.e., a best-fit surface profile is determined.

The discussion now addresses two different processes for determining a best-fit optical surface profile. These processes represent two different methods to calculate the changes in the respective optical surfaces required to compensate for the wavefront aberrations (i.e., the calculation summarized in step 430).

An Exemplary Embodiment

In one embodiment of the present invention, the calculated changes (step 430) are based on using an averaging technique over a representative collection of points. According to this embodiment, a representative collection of points in the object field and/or the image field are chosen. Optical path difference corresponding to the representative collection of points are averaged over the representative collection of points to compute a corrective surface profile for each optical surface m in the optical system. The averaging technique can be, but is not limited to, a least-squares average, a weighted average, or the like as would be apparent to a person having ordinary skill in the relevant art(s).

Figure 5:
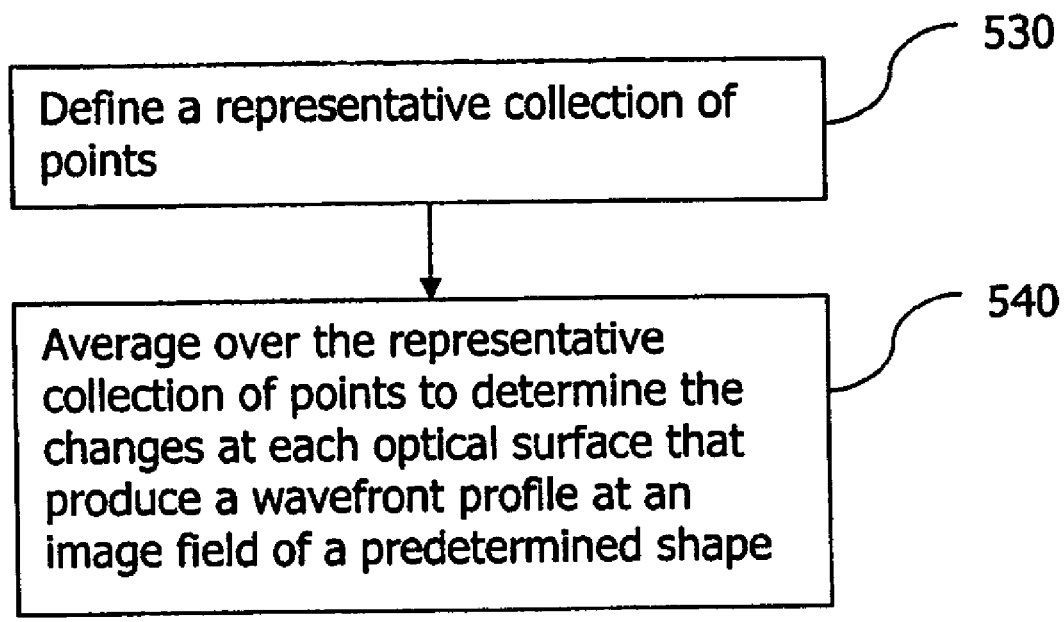
FIG. 5 is a flowchart depicting an exemplary method for determining modifications that can be made to an optical surface to reduce the aberrations caused by the optical surface.

FIG. 5 is used to describe this averaging technique. FIG. 5 is a flowchart depicting a method for calculating the surface corrections required to compensate for wavefront aberrations. The method begins in step 530, in which a representative collection of points is defined. The collection of points can be chosen from points ($x_0$, $y_0$) on the object field, or the optically conjugate points on the image field. For the example shown in FIG. 1, the representative collection of points can correspond to first position 101 and second position 103, or the images optically conjugate to first position 101 and second position 103, which are represented by circle 132 and circle 134, respectively.

In step 540, a representative ensemble of optical path difference functions is averaged over the representative collection of points to produce a wavefront profile at the image field of a predetermined shape. The following equation describes a generic averaging technique that can be employed to compute the corrective surface profile function for each optical surface m:

$$\Delta_m(x, y) = -\frac{\langle OPD_m(x_0, y_0, x, y)\rangle_N}{n-1}. \quad \text{Equation (3)}$$

In equation (3), $\Delta_m(x, y)$ is the deviation in thickness of the optical material from a spherical surface of the m-th surface in the optical system as a function of the coordinates (x, y) on the m-th optical surface. In addition, $\langle OPD_m(x_0, y_0, x, y)\rangle_N$ is the average over the ensemble of N object (image) field points ($x_0$, $y_0$) of the optical path deviation function $OPD_m(x_0, y_0, x, y)$ for the m-th optical surface, where the angled brackets $\langle \cdot \rangle$ represent an averaging process, e.g., a least squares average, a weighted average, or the like.

In other words, the method summarized in FIG. 5 is based upon finding the correction to the surface profile for each representative point in the field ($x_0$, $y_0$) and then applying the suitable averaging (e.g., a least-squares average, a weighted average, or the like) to these corrections to obtain the surface correction that produces a desired optical performance for all considered points in the object/image field.

The above-described method is based on Equation 1, which ignores the dependence of the optical path difference on the angle at which the light rays intersects the surface. However, generalizations of the above-described method can account for these angular dependencies and are contemplated within the scope of the present invention.

An Alternative Exemplary Embodiment

In another embodiment of the present invention, calculation of the surface correction function (step 430) is based upon selecting the surface correction yielding a minimum to a pre-defined quantitative measure.

Figure 6:
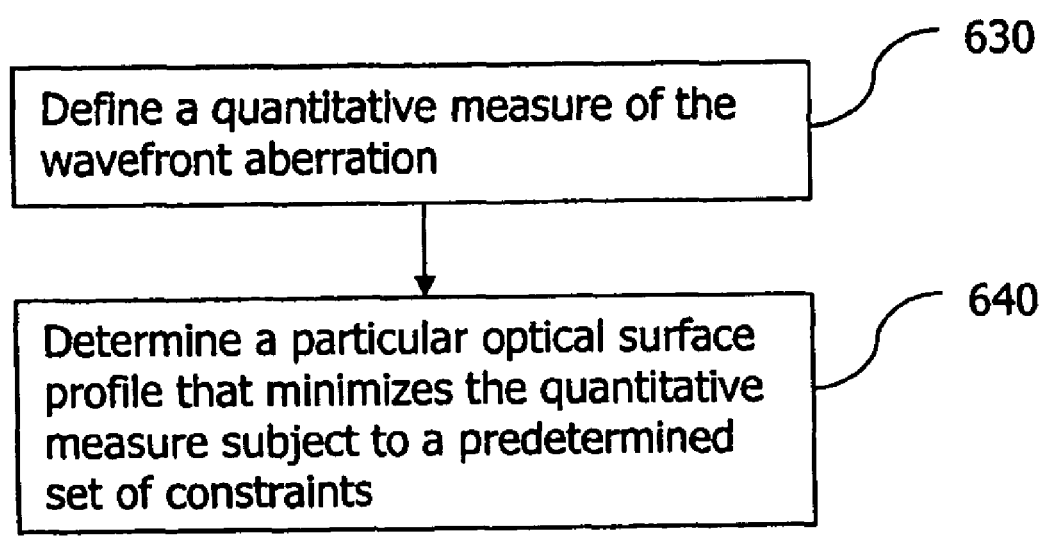
FIG. 6 is a flowchart depicting a method for determining modifications that can be made to an optical surface to reduce the aberrations caused by the optical surface, according to an alternative embodiment of the present invention.

FIG. 6 is a flowchart depicting a method for calculating the surface corrections required to compensate for wavefront aberrations. The method begins in step 630 in which a quantitative measure of the wavefront aberration is defined. One way to define a quantitative measure is to determine a suitable norm, as described below.

Consider a residual optical path difference for the field position $(x_0, y_0)$ after the surface correction $\Delta = \Delta(x, y)$ is applied, given by:

$$OPD(x,y,x_0,y_0) = F(\Delta(x,y),x_0,y_0). \qquad \text{Equation (4)}$$

(Note that the function F in this relation may take into account the fact that the light rays intersecting the surface intersect it at different angles; and therefore, the OPD acquired along each ray depends not only on the position of the refracting surface, but also on the angle at which the ray intersects it.) A norm (denoted by $\|\cdot\|$) of the above OPD is computed, for instance, by applying some averaging over $(x, y, x_0, y_0)$ to arrive at the functional to be minimized. The norm so applied to the function in Equation 4 can serve as the aforementioned quantitative measure.

In step 640, a particular optical surface profile that minimizes the quantitative measure is determined. In terms of the norm introduced in the previous paragraph, the problem reduces to the following: find a particular surface correction function, $\Delta = \Delta(x, y)$, such that the norm of the OPD, denoted by $\|F(\Delta(x, y), x_0, y_0)\|^2$, is minimized, subject to certain constraints on the surface shape correction function $\Delta = \Delta(x, y)$.

Many different constraints can be used without deviating from the scope and spirit of the present invention. As one example, the constraints can be used to enforce the manufacturability of the surface, e.g., by requiring that the higher spatial frequencies content in the surface shape is limited. As another example, constraints can be imposed to ensure that the surface that minimizes the functional in Eq. 4 does not "conflict" with other surfaces present in the projection optics (PO)—e.g., the thickness of the optimized surface cannot become negative after the surface correction is applied. Furthermore, constraints can be imposed to ensure that the corrected surface is forbidden from penetrating other optical elements (e.g., lenses) in the optical system. Other constraints will be become apparent to a person skilled in the relevant art(s) upon reading and understanding the teachings contained herein.

Persons having ordinary skill in the art will appreciate that the above-described surface optimization technique is a correction technique to a single surface. However, persons skilled in the relevant art(s) will appreciate that the functional defined in Eq. 4 can be extended to include the corrections to more than one surface. In other words, the above-described surface optimization technique can be extended to a simultaneous optimization of more than one surface.

Exemplary Implementation

Figure 7:
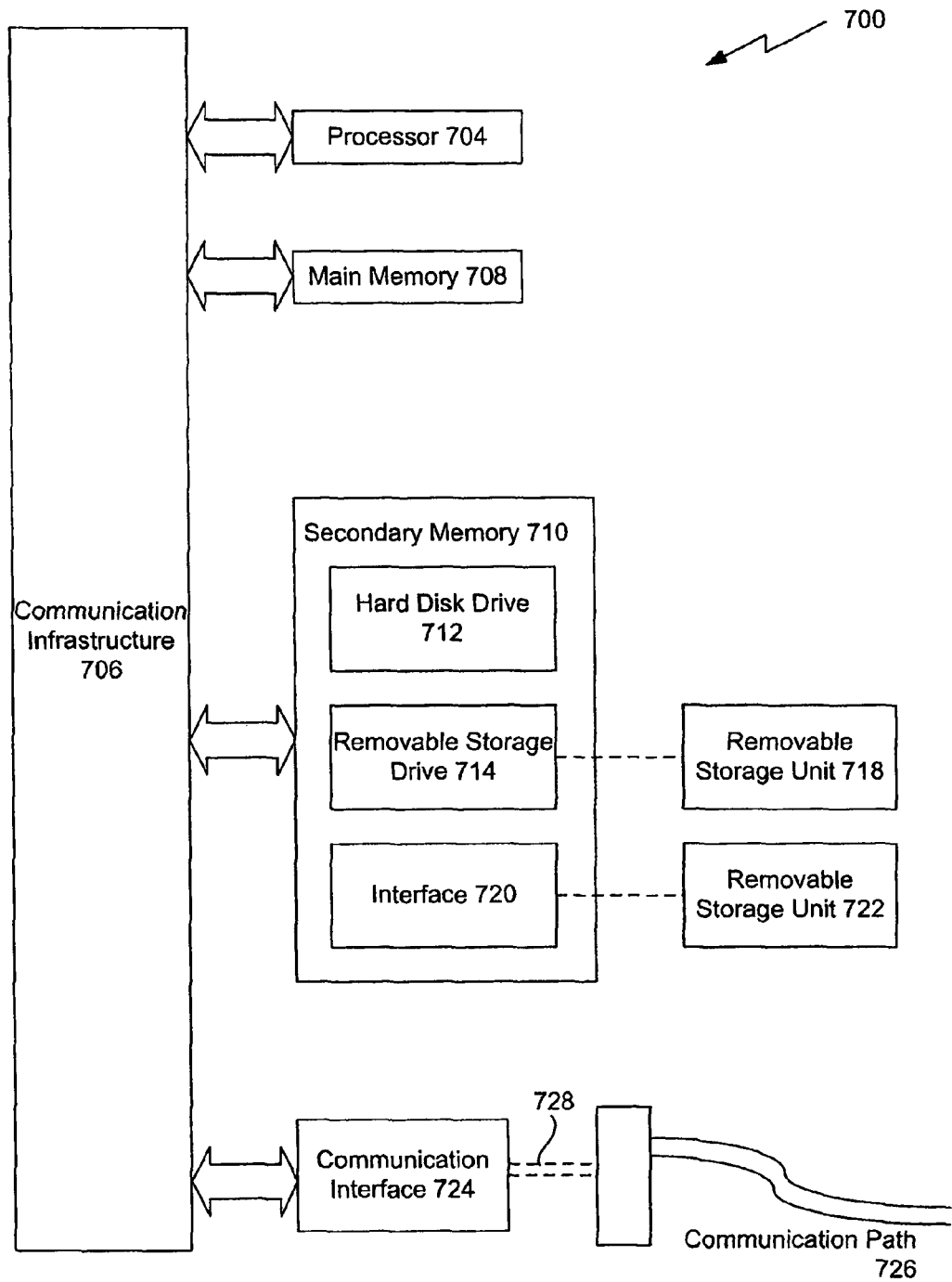
FIG. 7 is a block diagram of an exemplary computer system that may be used to implement an embodiment of the present invention.

Embodiments of the present invention can be implemented by software, firmware, hardware, or a combination thereof. For example, each of the methods, or portions thereof, described with reference to FIGS. 4, 5, and 6 can be implemented as computer-readable code. FIG. 7 illustrates an example computer system 700, in which the present invention, or portions thereof, can be implemented as computer-readable code. After reading this description, it will become apparent to a person skilled in the relevant art how to implement the invention using other computer systems and/or computer architectures.

The computer system 700 includes one or more processors, such as processor 704. Processor 704 can be a special purpose or a general purpose digital signal processor. The processor 704 is connected to a communication infrastructure 706 (for example, a bus or network). After reading this description, it will become apparent to a person skilled in the relevant art how to implement the invention using other computer systems and/or computer architectures.

Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical, or other signals capable of being received by communications interface 724. These signals 728 are provided to communications interface 724 via a communications path 726. Communications path 726 carries signals 728 and may be implemented using wire or cable, fiber optics, a phone line, a cellular phone link, an RF link and other communications channels.

In this document, the terms "computer program medium" and "computer usable medium" are used to generally refer to media such as removable storage drive 714, a hard disk installed in hard disk drive 712, and signals 728. Computer program medium and computer usable medium can also refer to memories, such as main memory 708 and secondary memory 710, which can be memory semiconductors (e.g. DRAMs, etc.) These computer program products are means for providing software to computer system 700.

Computer programs (also called computer control logic) are stored in main memory 708 and/or secondary memory 710. Computer programs may also be received via communications interface 724. Such computer programs, when executed, enable the computer system 700 to implement the present invention as discussed herein. In particular, the computer programs, when executed, enable the processor 704 to implement the processes of the present invention, such as performing the example methods, or portions thereof, discussed above. Accordingly, such computer programs represent controlling systems of the computer system 700. Where the invention is implemented using software, the software may be stored in a computer program product and loaded into computer system 700 using removable storage drive 714, hard drive 712 or communications interface 724.

The invention is also directed to computer products comprising software stored on any computer useable medium. Such software, when executed in one or more data processing device, causes the data processing device(s) to operation as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.). It is to be appreciated that the embodiments described herein can be implemented using software, hardware, firmware, or combinations thereof.

Discussion and Example Advantages

The example embodiments described above share a common background, but approach the problem from two ends. According to the first example embodiment, the problem is split into sub-problems (for each field point), the solution is obtained for each sub-problem and then these solutions are averaged. The result of this averaging is an adequate approximate solution to each of the sub-problems. The second example embodiment is based on a global solution to the minimization problem, taking into account the constraints on the shape variation. This approach may result in a better correction, but it generally requires more computations compared to the first embodiment.

There are several advantages to aspects of the present invention. For example, optical elements made according to aspects of the present invention can be added to existing optical designs resulting in improved optical performance without changing size, thickness and spacing of the elements in the existing designs.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for fabricating one or more portions of an optical system, the method comprising:
    defining a shape of one or more optical surfaces of one or more lenses in the optical system, such that each of the one or more optical surfaces is arranged to receive a wavefront;
    calculating one or more wavefront aberrations caused by a first optical surface among the one or more optical surfaces;
    calculating a change in the shape of the first optical surface required to compensate for the one or more wavefront aberrations caused by the first optical surface, wherein said calculating the change in the shape of the first optical surface comprises modifying a thickness of the first optical surface based on an optical path difference between spherical and aberrated wavefronts for an image ray emitted from the first optical surface and a refractive index of optical material between the first optical surface and a successive second optical surface;
    polishing, based on the calculated change in the shape, the first optical surface to compensate for the one or more wavefront aberrations.

2. The method of claim 1, wherein said calculating the change in the shape of the first optical surface comprises:
    defining one or more object points and image points optically conjugate to the one or more optical surfaces; and
    averaging an optical path difference function over the one or more object and image points to determine one or more changes in each of the one or more optical surface that produce a wavefront profile at an image field of a predetermined shape.

3. The method of claim 2, wherein said averaging the optical path difference function comprises using a least squares average.

4. The method of claim 2, wherein said averaging the optical path difference function comprises using a weighted average.

5. The method of claim 1, wherein said calculating the change in the shape of the first optical surface comprises:
    defining a quantitative measure of the one or more wavefront aberrations; and
    determining an optical profile for the first optical surface to minimize the quantitative measure of the one or more wavefront aberrations subject to a set of constraints.

6. The method of claim 5, wherein the quantitative measure comprises calculation of a norm of a optical path difference based on a function that takes into account one or more light rays intersecting the first optical surface at one or more different angles.

7. The method of claim 5, wherein the set of constraints comprises a surface correction function.

* * * * *